(12) United States Patent
Yu et al.

(10) Patent No.: US 10,121,474 B2
(45) Date of Patent: Nov. 6, 2018

(54) CONTEXTUAL NOTE TAKING

(71) Applicant: Microsoft Technology Licensing, LLC, Redmond, WA (US)

(72) Inventors: Jamie Yu, Redmond, WA (US); Roopesh Rajamani, Sammamish, WA (US); Om Krishna, Redmond, WA (US); Priya Vaidyanathan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 106 days.

(21) Appl. No.: 15/062,797

(22) Filed: Mar. 7, 2016

(65) Prior Publication Data

US 2017/0236517 A1    Aug. 17, 2017

Related U.S. Application Data

(60) Provisional application No. 62/296,596, filed on Feb. 17, 2016.

(51) Int. Cl.
*G06F 15/00* (2006.01)
*G10L 15/26* (2006.01)
(Continued)

(52) U.S. Cl.
CPC .......... *G10L 15/26* (2013.01); *G06F 3/04842* (2013.01); *G06F 17/212* (2013.01);
(Continued)

(58) Field of Classification Search
None
See application file for complete search history.

(56) References Cited

U.S. PATENT DOCUMENTS 6,252,948 B1    6/2001  Okamoto
7,296,218 B2    11/2007 Dittrich
(Continued)

OTHER PUBLICATIONS

"Sonocent Audio Notetaker", Retrieved on: Sep. 7, 2015 Available at: https://www.sonocent.com/en/audio-notetaker.
(Continued)

*Primary Examiner* — Richemond Dorvil
*Assistant Examiner* — Thuykhanh Le
(74) *Attorney, Agent, or Firm* — Talem IP Law, LLP

(57) ABSTRACT

Contextual note taking is described. A note taking assistant can receive an indication of a specific presentation session. This indication can be used by the note taking assistant to access information or content related to the session. The note taking assistant can receive specific presentation session content, which includes identifiable context images. Identifiable context images are meant to define an individual page, an individual slide, or other atomic unit in the presentation. The note taking assistant operates by receiving a navigation message, changing the current assistant context image to a current presenter context image based on the navigation message; receiving a speech-to-text message comprising a unit of text; displaying the current presenter context image, and displaying the unit of text associated with the current presenter context image; and storing the unit of text associated with the current presenter context image.

20 Claims, 10 Drawing Sheets

US 10,121,474 B2

Page 2

(51) Int. Cl.
*G06F 3/0484* (2013.01)
*G06F 17/21* (2006.01)
*G06F 17/28* (2006.01)
*G06F 17/24* (2006.01)
*G09B 5/00* (2006.01)
*G09B 5/06* (2006.01)
*G09B 5/08* (2006.01)
*G06Q 10/10* (2012.01)

(52) U.S. Cl.
CPC .......... *G06F 17/241* (2013.01); *G06F 17/289* (2013.01); *G06Q 10/10* (2013.01); *G09B 5/00* (2013.01); *G09B 5/06* (2013.01); *G09B 5/08* (2013.01)

(56) References Cited

U.S. PATENT DOCUMENTS

| | | | |
|---|---|---|---|
| 7,542,971 B2 | 6/2009 | Thione et al. | |
| 7,562,288 B2 | 7/2009 | Dittrich | |
| 7,962,525 B2 | 6/2011 | Kansal | |
| 8,165,609 B2 | 4/2012 | Fang | |
| 8,768,705 B2 | 7/2014 | Sundararaman et al. | |
| 8,868,430 B2 | 10/2014 | Burvall et al. | |
| 2005/0034079 A1* | 2/2005 | Gunasekar | G06F 17/289 715/753 |
| 2007/0133437 A1 | 6/2007 | Wengrovitz et al. | |
| 2007/0186147 A1* | 8/2007 | Dittrich | G06F 17/30056 715/203 |
| 2009/0252159 A1* | 10/2009 | Lawson | H04M 7/0021 370/352 |
| 2011/0288863 A1* | 11/2011 | Rasmussen | G06F 17/2775 704/235 |
| 2012/0209906 A1* | 8/2012 | Ausfeld | H04L 12/1818 709/204 |
| 2012/0245936 A1* | 9/2012 | Treglia | G06F 17/30746 704/235 |
| 2012/0313837 A1* | 12/2012 | Yoshizawa | G06F 3/14 345/1.2 |
| 2013/0058471 A1* | 3/2013 | Garcia | H04M 3/42221 379/202.01 |
| 2013/0144603 A1* | 6/2013 | Lord | H04L 12/1831 704/9 |
| 2013/0179150 A1* | 7/2013 | Eriksson | G06Q 10/10 704/9 |
| 2013/0311177 A1 | 11/2013 | Bastide et al. | |
| 2014/0123002 A1 | 5/2014 | Wessling et al. | |
| 2014/0160153 A1 | 6/2014 | Singh | |
| 2014/0187208 A1* | 7/2014 | De Oliveira | H04M 3/42221 455/412.1 |
| 2014/0278405 A1* | 9/2014 | Peters | G10L 15/1822 704/235 |
| 2014/0280186 A1* | 9/2014 | Peters | G06F 17/30613 707/741 |
| 2014/0365200 A1* | 12/2014 | Sagie | G06F 17/289 704/2 |
| 2015/0149540 A1* | 5/2015 | Barker | H04L 12/1827 709/204 |
| 2015/0149929 A1* | 5/2015 | Shepherd | H04L 65/403 715/753 |
| 2015/0154291 A1* | 6/2015 | Shepherd | G06F 17/30861 707/748 |
| 2015/0169069 A1* | 6/2015 | Lo | G06F 3/017 715/753 |
| 2015/0179186 A1* | 6/2015 | Swierk | G06F 3/167 704/276 |
| 2015/0286634 A1* | 10/2015 | Shin | G06F 17/2785 704/2 |
| 2015/0309996 A1* | 10/2015 | Han | G06K 9/00442 704/2 |
| 2015/0336578 A1* | 11/2015 | Lord | B60T 17/22 701/2 |
| 2015/0350451 A1* | 12/2015 | Aue | H04M 3/568 379/202.01 |
| 2016/0006983 A1* | 1/2016 | Makela | H04N 7/15 348/14.03 |
| 2016/0070678 A1* | 3/2016 | Kidron | G09B 5/06 715/730 |
| 2016/0085747 A1* | 3/2016 | Kamatani | G06F 17/289 704/277 |
| 2016/0189103 A1* | 6/2016 | Liu | G06Q 10/10 704/9 |
| 2016/0189107 A1* | 6/2016 | Liu | G06Q 10/1091 704/214 |
| 2016/0189713 A1* | 6/2016 | Liu | G06F 17/248 704/235 |
| 2016/0234265 A1* | 8/2016 | Lohe | H04L 65/403 |
| 2016/0328104 A1* | 11/2016 | Chandra | G06F 3/0483 |
| 2017/0083214 A1* | 3/2017 | Furesjo | G06F 3/04845 |
| 2017/0090692 A1* | 3/2017 | Kurita | G06F 3/0482 |

OTHER PUBLICATIONS

Simonite, Tom., "Text and Voice Translation in Real Time", Published on: Apr. 19, 2011 Available at: http://www.technologyreview.com/article/423745/text-and-voice-translation-in-real-time/.

Sinkov, Andrew., "Evernote for Android Update: Speech-to-text and Big Widget Enhancements", Published on: Mar. 27, 2012 Available at: https://blog.evernote.com/blog/2012/03/27/evernote-for-android-update-speech-to-text-and-big-widget-enhancements/.

"Skype opens door to real-time translation feature", Published on: May 14, 2015 Available at: http://www.japantoday.com/category/technology/view/skype-opens-door-to-real-time-translation-feature.

Schultz, Marianne., "'Speech Notes' Converts Your Speech to Text Notes and Stores Your Typed Notes", Published on: Aug. 11, 2011; Available at: http://appshopper.com/blog/2011/08/11/speech-notes-converts-your-speech-to-text-notes-and-stores-your-typed-notes/.

"TranscriVox: Automatic note taking for one and all: Originally designed for people with learning differences like dyslexia, this app is perfect for taking notes!", Published on: Jun. 18, 2015; Available at: http://icrowdnewswire.com/2015/06/18/transcrivox-automatic-note-taking-for-one-and-all-originally-designed-for-people-with-learning-differences-like-dyslexia-this-app-is-perfect-for-taking-notes/.

Sladek, et al., "Speech-to-Text Transcription in Support of Pervasive Computing", In Proceedings of the conference on Pervasive computing, vol. 25, Aug. 1, 2004, 6 pages.

"Automatic Speech Recognition Software & Instant Translation", Published on: Apr. 25, 2015 Available at: https://speechlogger.appspot.com/en/.

"One-touch Voice Note", Retrieved on: Sep. 7, 2015 Available at: https://play.google.com/store/apps/details?id=com.cah.VoiceNote&hl=en.

Ochs, Susie., "8 essential mobile apps for college students", Published on: Aug. 29, 2013 Available at: http://www.pcworld.com/article/2047671/8-essential-mobile-apps-for-college-students.html.

"The tool that tailors Office 365 to teaching", Published on: Jun. 7, 2014 Available at: http://www.teacherdashboard365.com/what-is-teacher-dashboard.

"About Classroom", Published on: Apr. 19, 2015 Available at: https://support.google.com/edu/classroom/answer/6020279?hl=en.

"Frequently Asked Questions about the OneNote Class Notebook app", Retrieved on: Sep. 7, 2015 Available at: https://support.office.com/en-us/article/Frequently-Asked-Questions-about-the-OneNote-Class-Notebook-app-9183c502-9374-42a7-8d59-3a17c377077d.

"Create and print notes pages", Retrieved on: Sep. 7, 2015 Available at: https://support.office.com/en-nz/article/Create-and-print-notes-pages-26eec4be-0c17-435b-a4d2-e33d76f21810.

"International Search Report and Written Opinion Issued in PCT Application No. PCT/US2017/017084", dated Jun. 14, 2017, 10 Pages.

* cited by examiner

FIG. 8B

| Slide | Thumbnail | Notes | Presentation |
|---|---|---|---|
| | | | 820 |
| 1 | Math 101<br>Lecture 5<br>Long Division | Take slide 1 notes here: | Welcome back to Math 101.<br>Today we will be continuing our review of long division... |
| 2 | Homework Due<br>Pgs. 50-53<br>All even numbers | Take slide 2 notes here: | |
| 3 | Steps<br>1. Division Step<br>2. Multiplication Step<br>3. Subtraction Step | Take slide 3 notes here: | First we perform division,<br>संख्या तो हो सकता है... |

Note Taking Program
~~Class:~~ Math 101-Session 10   Presentation: http://d.docs.live.net/....../mathclass10.pptx
~~Date:~~ Fri Jul 31 2015

(labels: 822, 812, 814, 821)

CONTEXTUAL NOTE TAKING

CROSS REFERENCE TO RELATED APPLICATION(S)

This application claims the benefit of U.S. Provisional Application Ser. No. 62/296,596, filed Feb. 17, 2016.

BACKGROUND

Presentations can be conducted in many different settings, such as classrooms, meetings, seminars, and conferences. Attendees of such presentations use different resources to take notes on the presenter's verbal content. These resources include manually writing the notes on paper or typing the notes into a word processor application, presentation application, or a note taking application such as Microsoft OneNote® or Evernote®.

However, note taking can be challenging and time consuming for the attendee. Often times, the note taker spends more time typing notes than listening to the presenter, resulting in a loss of valuable verbal discussion, incomplete notes, or even inaccurate notes.

BRIEF SUMMARY

Systems and techniques for contextual note taking are described. A note taking assistant is provided that can communicate with or be part of a note taking application (or other productivity application). The note taking assistant receives content originating from a presentation capture application to support and supplement note taking related to content being presented. The presentation capture application enables audio to be captured while a specific presentation session content is being presented using a presentation application.

The presentation capture application has a broadcast mode in which messages providing speech-to-text and navigation information can be transmitted to devices running the note taking assistant. For example, when a presenter speaks into a microphone, the audio is captured by a presentation capture application and converted into text through, for example, a speech-to-text (STT) service or a local program at the presenter's device. The text is associated with the content of the presentation that is being displayed by the presentation application "current presenter content image" and both the text, as STT data, and information about the current presenter content image, as navigation data, are broadcasted or otherwise transmitted to the note taking assistant.

The note taking assistant can receive an indication of a specific presentation session. This indication can be used by the note taking assistant to access information or content related to the session or to simply provide a title for including in the note taking application. The note taking assistant can receive specific presentation session content, which includes identifiable context images. Identifiable context images are meant to define an individual page, an individual slide, or other atomic unit in the presentation. The note taking assistant operates by receiving a navigation message, changing the current assistant context image to a current presenter context image based on the navigation message; receiving a speech-to-text message comprising a unit of text; displaying the current presenter context image, and displaying the unit of text associated with the current presenter context image; and storing the unit of text associated with the current presenter context image.

Regardless of what slide or page in the presentation the attendee is currently viewing, the note taking assistant will display and store the presenter's converted audio content associated with the correct slide or page of the presentation. Thus, an inattentive attendee or one that is making notes on a different part of the presentation can avoid missing any of the presenter's verbal content and have that verbal content properly associated with the correct visual content.

The note taking assistant can support multiple languages by using a translation service. When the note taking assistant receives a request for translation, the note taking assistant can send a request to a translation service. The request includes a target language and the most recent unit of text associated with a current presenter context image. The note taking assistant then receives, displays and stores the translated unit of text associated with the context image.

The note taking assistant can be integrated with or communicate with a note taking application to populate a note with the presenter's verbal content. In one case, a special form can be inserted into the note and populated with the identifiable context images. The note taking assistant can then provide the received text units for association with the appropriate context image. In this manner, a user of the note taking application can annotate and take additional notes while having the presenter's verbal content automatically populate the form.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 8A and 8B illustrate example scenarios for contextual note taking.

DETAILED DESCRIPTION

Systems and techniques for contextual note taking are described. A note taking assistant is provided that can communicate with or be part of a note taking application (or other productivity application). The note taking assistant receives content originating from a presentation capture application to support and supplement note taking related to content being presented. The presentation capture application enables audio to be captured while a specific presentation session content is being presented using a presentation application.

In accordance with various embodiments of the invention, a presenter can give a presentation, using a presentation application and a presentation capture application, and attendees can hear the presenter and see the presentation in person or online and perform contextual note taking using a note taking assistant.

Figure 1:
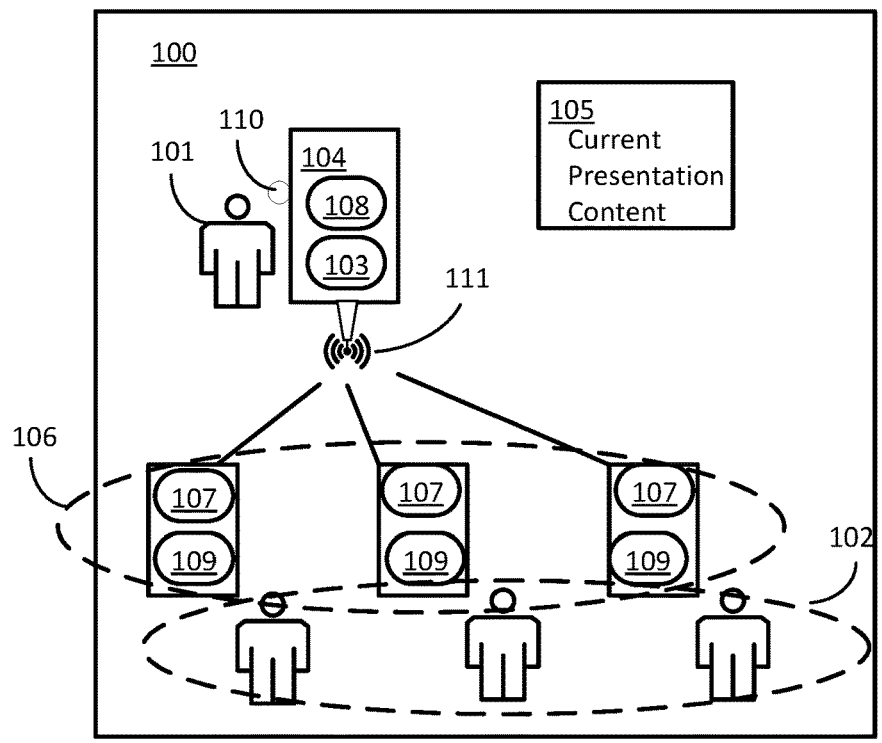
FIGS. 1-3 illustrate example scenarios employing contextual note taking.
Figure 2:
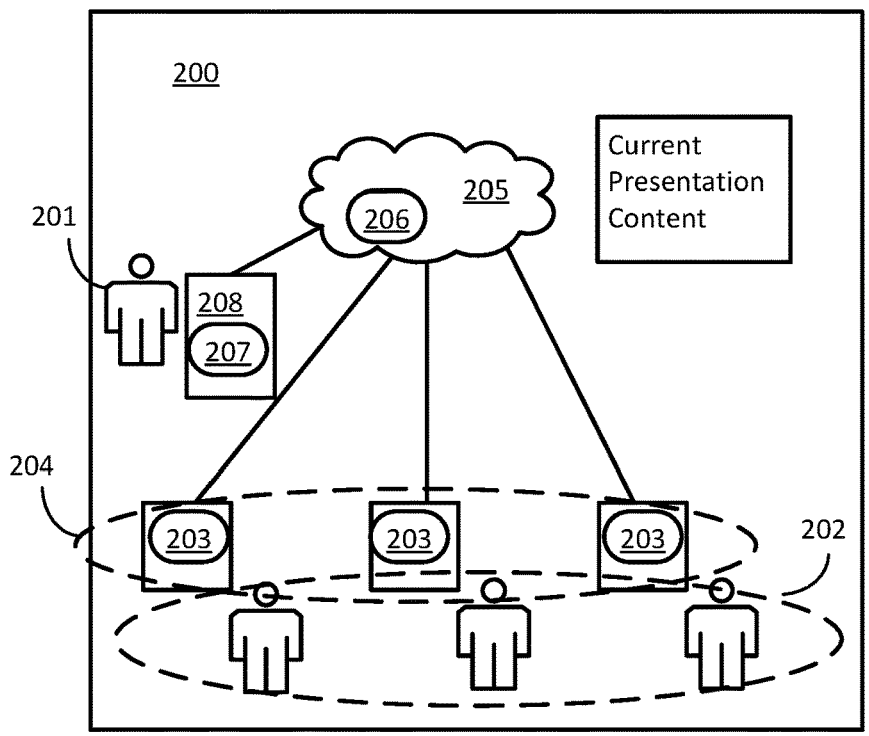
Figure 3:
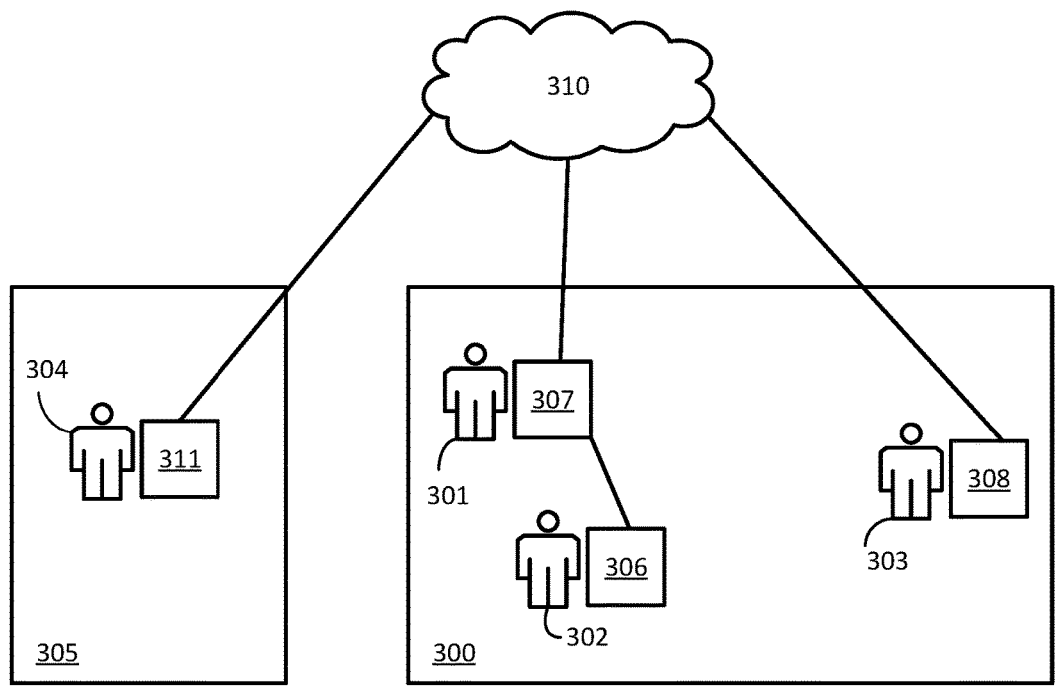

FIGS. 1-3 illustrate example scenarios for employing contextual note taking. Referring to FIG. 1, a presenter 101 and attendees 102 may all be in the same physical location 100, for example in a class room. In a typical fashion, the presenter 101 can give a presentation as part of a specific presentation session (e.g., a class room lesson for a particular course). Using a presentation application 103 running on the presenter's computing device 104, the specific presentation session content can be displayed at the presenter's computing device 104 and, when available, on a screen 105 (e.g., via a room display or on a surface via a projector).

The attendees 102 can receive the specific presentation session content so that they have the content at their corresponding computing devices 106 and can take notes using a note taking application 107 or other productivity application. Contextual note taking can be accomplished using a presentation capture application 108 at the presenter's computing device 104 and a note taking assistant 109 at the attendee's computing device 106. The presentation capture application 108 can be integrated as part of (e.g., built-in or as a plug-in) the presentation application 103. The note taking assistant 109 can be a stand-alone application or be integrated with (either built-in or provided as a plug-in) the note taking application 107 or other productivity application.

The presentation capture application 108 has a broadcast mode in which messages providing speech-to-text and navigation information can be transmitted to the computing devices 106 running the note taking assistant 109. For example, when the presenter 101 speaks into a microphone 110, the audio is captured by the presentation capture application 108 and converted into text through, for example, a speech-to-text (STT) service or a local program at the presenter's device. The text is associated with the content of the presentation that is being displayed by the presentation application "current presenter content image" and both the text, as STT data, and information about the current presenter content image, as navigation data, are broadcasted or otherwise transmitted to the note taking assistants 109.

In the implementation environment illustrated in FIG. 1, the presentation capture application 108 can enable direct broadcasting 111 from the presenter's computing device 104 (or connected broadcasting device) to the attendees' computing devices 106 of the text and navigation information. The mode of communication can be any suitable near or mid-field point-to-point connection, such as Bluetooth. That is, the presentation capture application 108 may capture audio from the presenter, identify the content being discussed from the specific presentation session content that the presenter is currently presenting from the presenter, and locally broadcast to the attendee computing devices 106 located in the same physical room. In this manner, the note taking assistants 109 enable contextual note taking when in the physical presence of a presenter using a presentation capture application and only the presenter's computing device 104 need be able to access the Internet during the presentation (if using a STT service instead of a local program for STT).

In the implementation environment illustrated in FIG. 2, the presenter 201 and the attendees 202 are still in a same physical location 200. However, instead of receiving information directly from a presenter's computing device as in FIG. 1, note taking assistants 203 at attendee computing devices 204 receive the information via a network such as over the Internet 205. A note taking assistant service 206 can be supported at a server and can receive information from a presentation capture application 207 at the presenter computing device 208 and transmit that information to the note taking assistants 203 at the attendee computing devices 204. In this implementation, the attendees may be registered for the specific presentation session so that they can receive the information. In some cases, the transmission of the information to the note taking assistants can be controlled such that only the attendees in physical proximity to the presenter can receive the information.

In the implementation environment illustrated in FIG. 3, a combination of communication modes may be available. For example, attendee 301 and attendee 302 may both be in a same physical location 300 as a presenter 303 and attendee 304 may be at a location 305 remote from the presenter 303. In the presentation room 300, attendee 301 may receive, at computing device 306, the broadcast directly from the presenter's computing device 307 (or connected broadcasting device) such as described with respect to the environment of FIG. 1. Since online broadcasting is enabled, some attendees in the presentation room 300, such as attendee 303 with computing device 308, may receive the information over the Internet 310 such as described with respect to FIG. 2. In this implementation, physical presence may not be required and thus, attendee 304 may receive the information at their computing device 311 at the remote location 305.

As can be seen by some of the environments in which the described note taking assistant can be deployed, this functionality can be used in schools and online classrooms, at conferences in seminars and meetings with global participants. The functionality can be helpful for people with special needs. In addition, real-time translation can be included to help international students.

Figure 4:
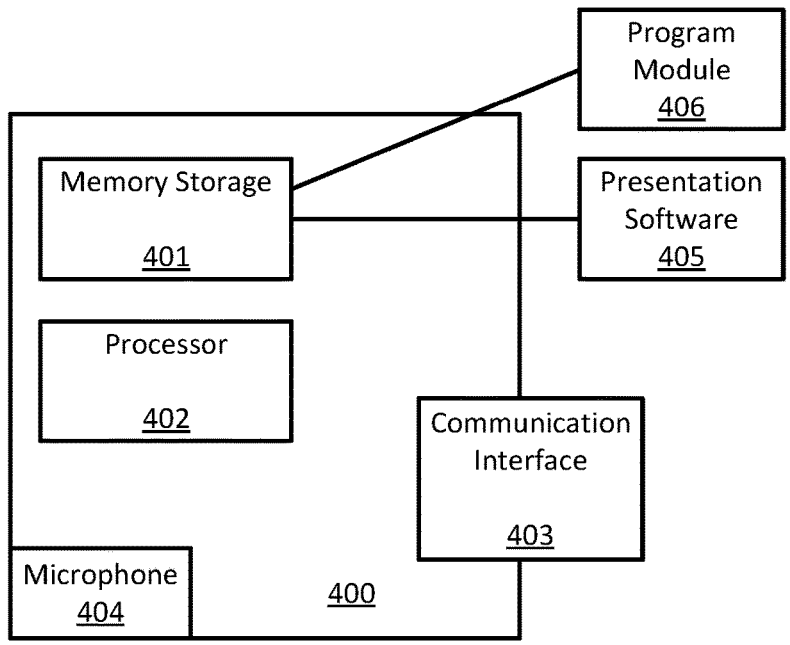
FIG. 4 illustrates a system architecture of an example implementation of a presenter's device.

FIG. 4 illustrates a system architecture of an example implementation of a presenter's device. Presentation device 400 can be any computing device such as but not limited to a laptop, desk top, tablet, smart television, smart phone, or other computing device supporting a presentation capture application. Devices 104, 208, and 307 may be embodied as attendee computing device 500. Referring to FIG. 4, the presentation device 400 at least includes a memory storage 401, processor 402, communication interface 403, and microphone 404.

The storage 401 may store a presentation program software 405 and a presentation capture application 406. In some cases, the presentation capture application 406 is a plug-in or included as part of the presentation program software 405. The processor 402 may include one or more processors and/or other circuitry that retrieves and executes presentation program software 405 and presentation capture application 406 from storage 401.

Storage 401 may be volatile and/or nonvolatile, removable and/or non-removable media implemented in any method or technology for storage of information, such as computer readable instructions, data structures, program modules, or other data. Examples of storage 401 include random access memory, read only memory, magnetic disks, optical disks, CDs, DVDs, flash memory, virtual memory and non-virtual memory, magnetic cassettes, magnetic tape, magnetic disk storage or other magnetic storage devices, or any other suitable storage media. In no case should a "storage medium" (or "storage media") be interpreted to be a propagated signal or carrier wave.

Storage 401 may be implemented as a single storage device but may also be implemented across multiple storage devices or sub-systems co-located or distributed relative to each other. Further, storage 401 may include additional elements, such as a controller, capable of communicating with processor 402.

Examples of processor 402 include general purpose central processing units, application specific processors, and logic devices, as well as any other type of processing device, combinations, or variations thereof. The one or more processing devices may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general purpose CPU.

Communication interface 403 allows for communication between device 400 and other computing systems (not shown) over a communication network or collection of networks (not shown) or the air. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

Microphone 404 can be a built-in or a separate microphone that can be coupled to device 400 via a microphone input port (e.g., via a USB or TRS jack).

Aspects of presentation device 400 may be implemented within a single computing device but may also be distributed across multiple processing devices or sub-systems that cooperate in executing program instructions.

Figure 5:
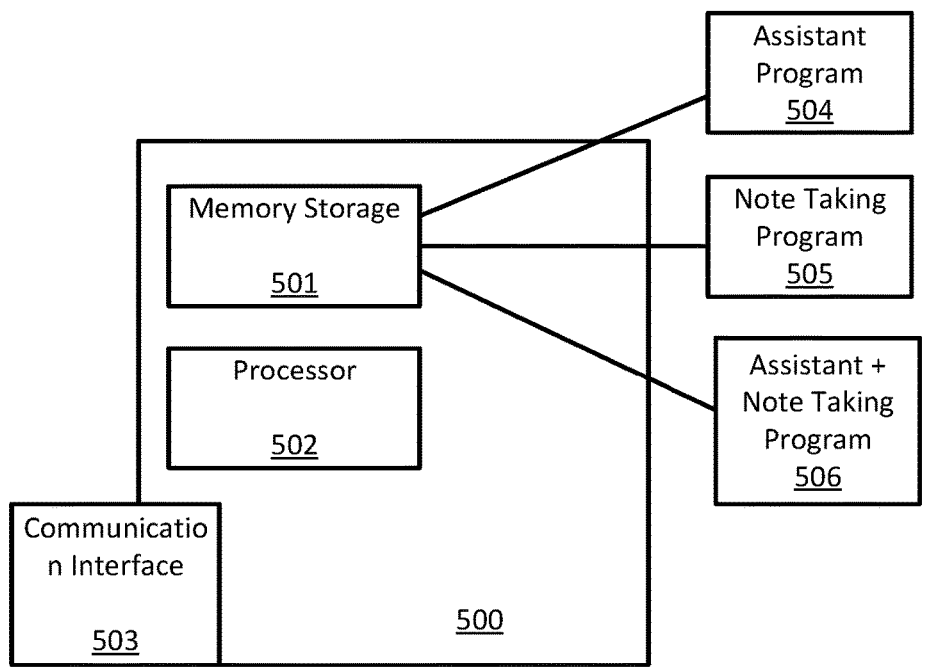
FIG. 5 illustrates a system architecture of an example implementation of an attendee's device.

FIG. 5 illustrates a system architecture of an example implementation of an attendee's device. An attendee computing device 500 can be any computing device such as but not limited to a laptop, desk top, tablet, smart television, smart phone, or other computing device supporting a note taking assistant. Devices 106, 203, 306, 308, and 311 may be embodied as attendee computing device 500. Referring to FIG. 5, the attendee computing device 500 at least includes memory storage 501, a processor 502, and a communication interface 503.

The storage 501 may store a note taking assistant 504 and a note taking application 505. In some cases, the note taking assistant 504 is a plug-in or included as part of the note taking application 505, such as note taking application 506. In some cases, note taking application 505 or note taking application 506 have corresponding online services that enable cross-platform and cross-device note taking for a user's stored notes.

The processor 502 may include one or more processors and/or other circuitry that retrieves and executes note taking assistant 504 and note taking application 505 or note taking application 506 from storage 401.

Storage 501 may be volatile and/or nonvolatile, removable and/or non-removable media implemented in any method or technology for storage of information, such as computer readable instructions, data structures, program modules, or other data. Examples of storage 501 include random access memory, read only memory, magnetic disks, optical disks, CDs, DVDs, flash memory, virtual memory and non-virtual memory, magnetic cassettes, magnetic tape, magnetic disk storage or other magnetic storage devices, or any other suitable storage media. In no case should a "storage medium" (or "storage media") be interpreted to be a propagated signal or carrier wave.

Storage 501 may be implemented as a single storage device but may also be implemented across multiple storage devices or sub-systems co-located or distributed relative to each other. Further, storage 501 may include additional elements, such as a controller, capable of communicating with processor 502.

Examples of processor 502 include general purpose central processing units, application specific processors, and logic devices, as well as any other type of processing device, combinations, or variations thereof. The one or more processing devices may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general purpose CPU.

Communication interface 503 allows for communication between device 500 and other computing systems (not shown) over a communication network or collection of networks (not shown) or the air. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

Aspects of attendee computing device 500 may be implemented within a single computing device but may also be distributed across multiple processing devices or sub-systems that cooperate in executing program instructions.

Figure 6A:
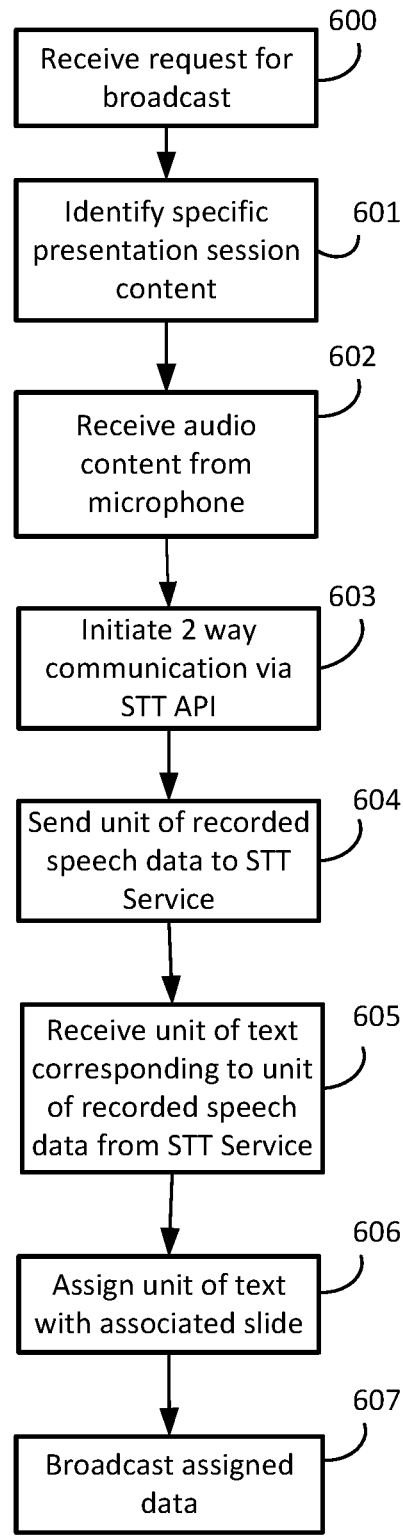
FIGS. 6A-6C illustrate example process flow diagrams for a presentation capture application for contextual note taking.
Figure 6B:
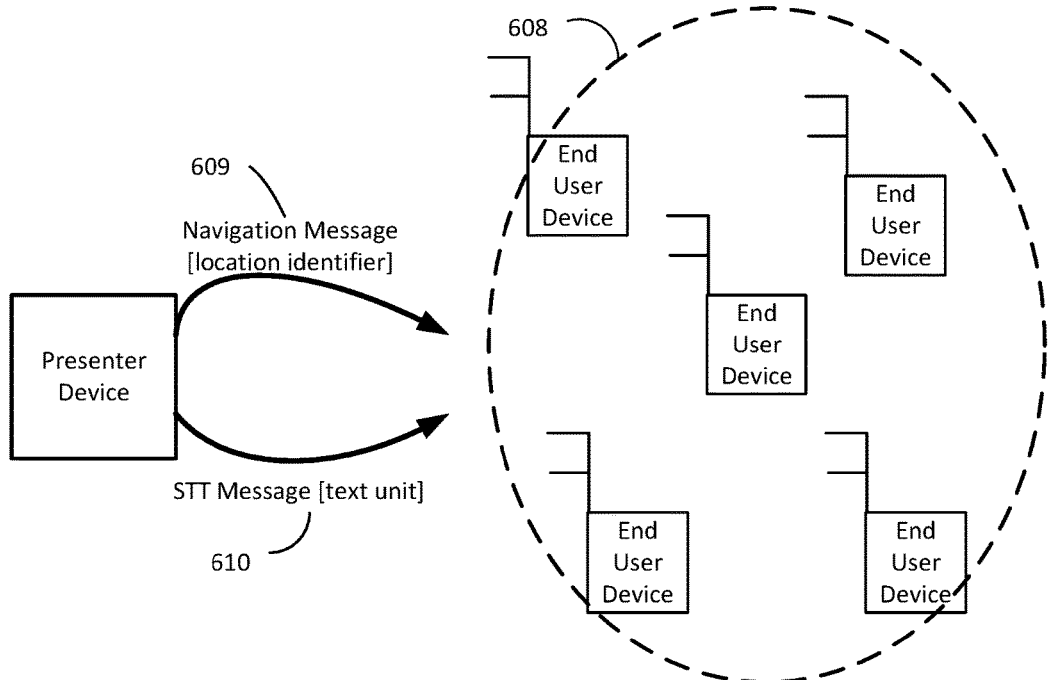
Figure 6C:
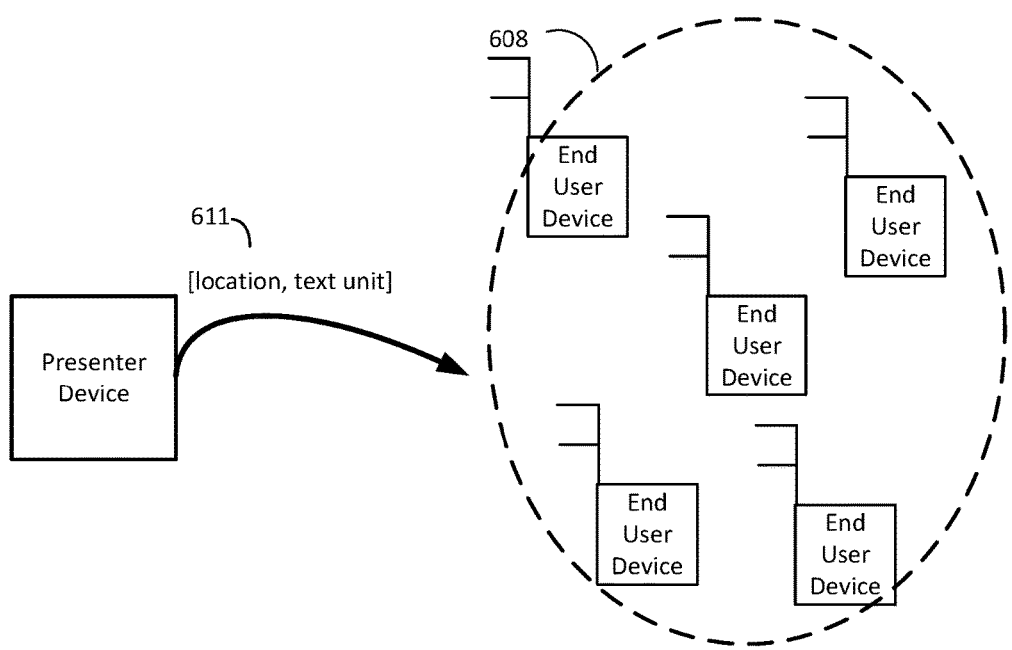

FIGS. 6A-6C illustrate example process flow diagrams for a presentation capture application for contextual note taking.

Referring to FIG. 6A, when a presenter is in a presentation software program, the presentation capture application may receive a request for broadcast mode (600) and identify specific presentation session content (601). The specific presentation session content may comprise identifiable context images. In one embodiment, the presentation software may be Microsoft PowerPoint® and the specific presentation session content is a slide deck for a specific presentation. In this example case, an identifiable context image refers to a slide in the presentation. Thus, each presentation may have many identifiable context images, one for each slide.

Once the presenter starts the presentation, the presentation capture application module may receive audio input from a microphone for the presenter's device (602). The presentation capture application can, in this implementation, then initiate two-way communication with a speech to text (STT) service via a STT application programming interface (API) (603). The STT service may be any available/accessible online service. In some cases, the STT service is a local application running on the presenter's device. Once the two-way communication has been established, the presentation capture application may send units of recorded speech data to the STT service via the STT API (604) and in return receive a unit of text corresponding to the unit of recorded speech data (605).

After the unit of text is returned, the presentation capture application may then assign the unit of text with the associated location in the specific presentation session content 606). The associated location may be a slide number, a page number, or the like. In some cases, the text can be displayed on the presenter's device screen. Additionally, the assigned data (the unit of text) may be broadcast (607). The data may be broadcast wired or wirelessly, point-to-point, or over local area network (LAN), a wide area network (WAN), cellular network (e.g. wireless phone), WiFi network, intranet, extranet, Internet, ad-hoc network, or a combination thereof. The particular network can depend on the implementation, for example, as described in the scenarios of FIGS. 1-3.

FIGS. 6B and 6C illustrate two example information broadcasting schemes for operation 607. In one case, as illustrated in FIG. 6B, the assigned data may be broadcast over to devices 608 executing note taking assistants in two types of messages. One type of message is a navigation message 609, containing a location identifier. The location identifier provides the location, such as the slide number or the page number, that the presenter is displaying. The other type of message is a STT message 610. The STT message 610 contains the unit of text that can be associated with the current location at the note taking assistant. As the presenter changes slides, a new navigation message can be generated to inform the note taking assistant that subsequent STT messages are to be associated with the new slide. In another case, as illustrated in FIG. 6C, the message 611 includes both a unit of text and the location identifier so that the note taking assistant may not be required to keep track of the current image context when receiving the units of text. Thus, letting the note taking assistant know the unit of text associated with the current location and the current location.

Figure 7A:
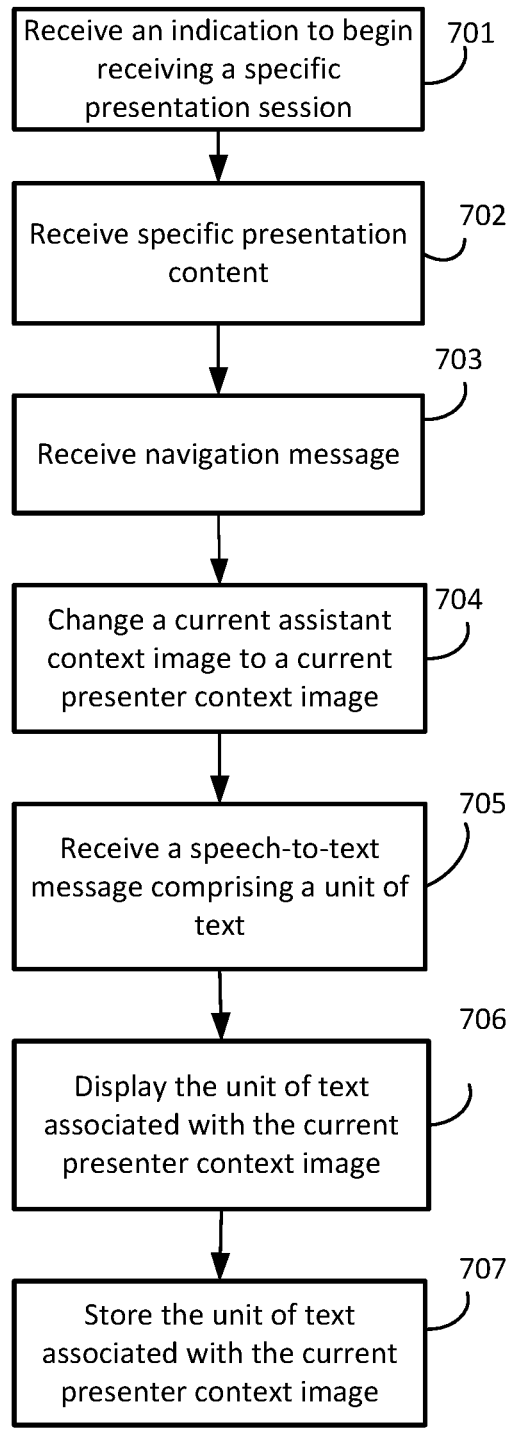
FIGS. 7A and 7B illustrate example process flow diagrams for a note taking assistant for contextual note taking.
Figure 7B:
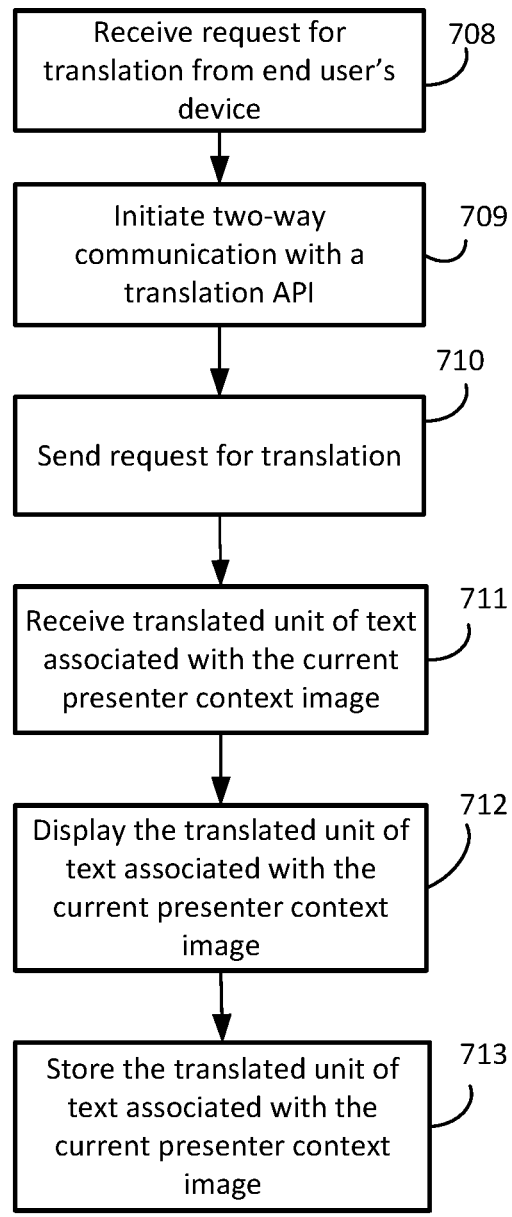

FIGS. 7A and 7B illustrate example process flow diagrams for a note taking assistant for contextual note taking. In some cases, when a note taking assistant is initiated, the note taking assistant begins searching for broadcasts in its vicinity. If so, the note taking assistant may provide an option to a user to select a specific presentation session. Referring to FIG. 7A, a note taking assistant can receive an indication to begin receiving a specific presentation session (701). The note taking assistant can receive specific presentation content (702). The specific presentation content comprises identifiable context images. Identifiable context images are meant to define an individual page, an individual slide, or other atomic unit in the presentation (e.g. slides in a power point, pages in a word document, or the like). In some cases, the note taking assistant receives the specific presentation content by receiving a uniform resource locator (URL) message and then retrieving the specific presentation content at the URL location. In some cases, the note taking assistant receives the specific presentation content through direct broadcasting (e.g., Bluetooth) or other communication modalities from a device in the physical environment (e.g., the presenter's computer).

In conjunction with receiving the specific presentation content, the note taking assistant may populate a notebook form with the specific presentation content. The note taking assistant may alternatively, or in addition, populate a note taking assistant user interface.

The note taking assistant operates by receiving a navigation message, changing the current assistant context image to a current presenter context image based on the navigation message; receiving a speech-to-text message comprising a unit of text; displaying the current presenter context image, and displaying the unit of text associated with the current presenter context image; and storing the unit of text associated with the current presenter context image.

That is, when the note taking assistant receives a navigation message (703), a location identifier can be identified from the navigation message and be used to identify the current location within the presentation where the presenter is speaking.

Upon receiving the navigation message, the note taking assistant may change a current assistant context image to a current presenter context image (704). The current assistant context image is the context image that the note taking assistant software may be pointing to (e.g., in a table or other data structure) and to which any text units being received are assigned. The current presenter context image is the context image that the presenter's presentation application is currently on (and displaying). Once the current assistant context image is changed to the current presenter context image, the current presenter image becomes the current assistant context image.

The note taking assistant may receive a STT message (705). The STT message comprises a unit of text that is to be associated with the current presenter context image. Upon receipt, the note taking assistant may then display the unit of text associated with the current presenter context image (706). Further, the note taking assistant can store the unit of text associated with the current presenter context image (707). The note taking assistant may have its own graphical user interface in which the images and text are displayed (see e.g., FIG. 8A).

Figure 8A:
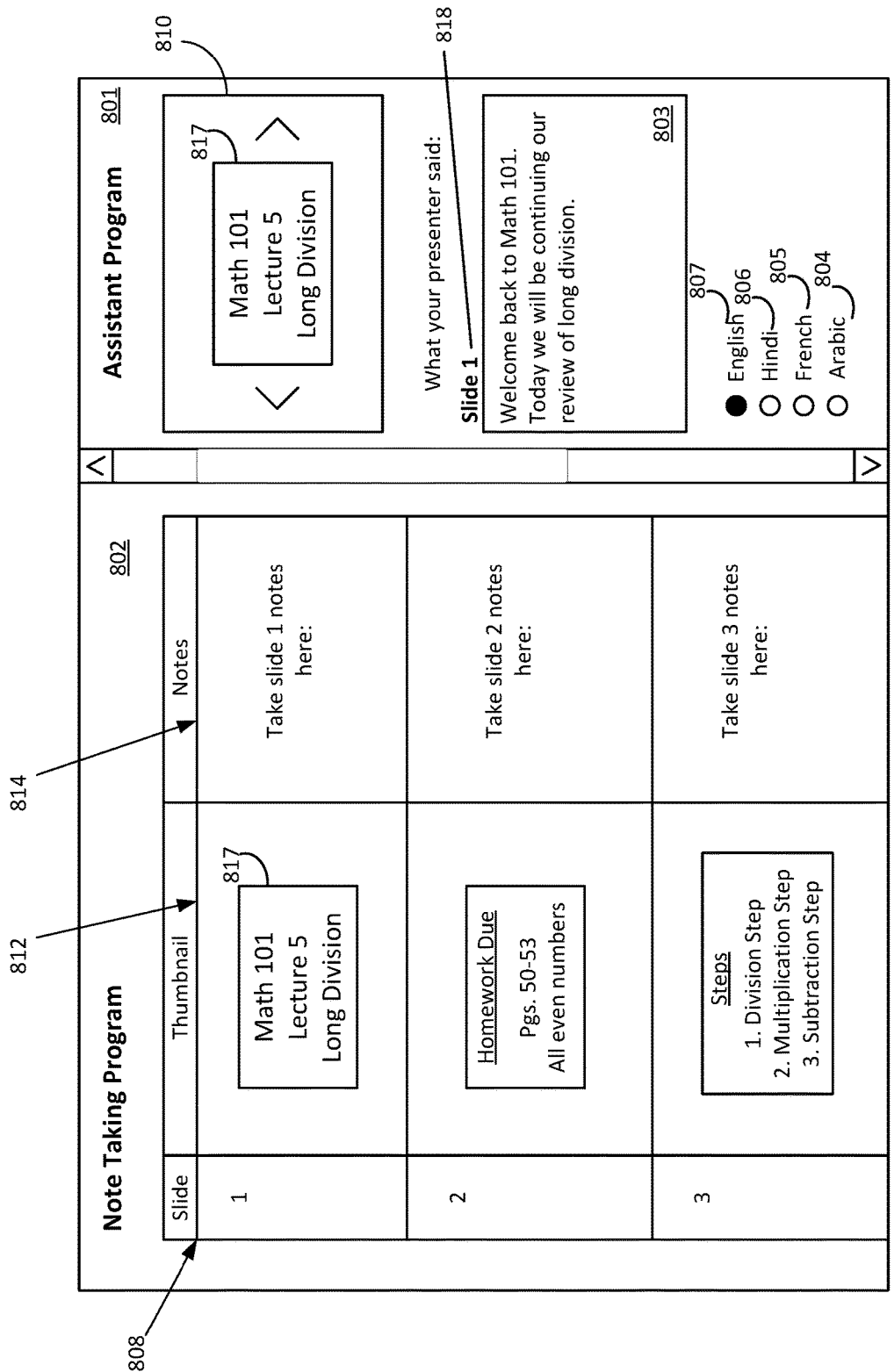
Figure 9:
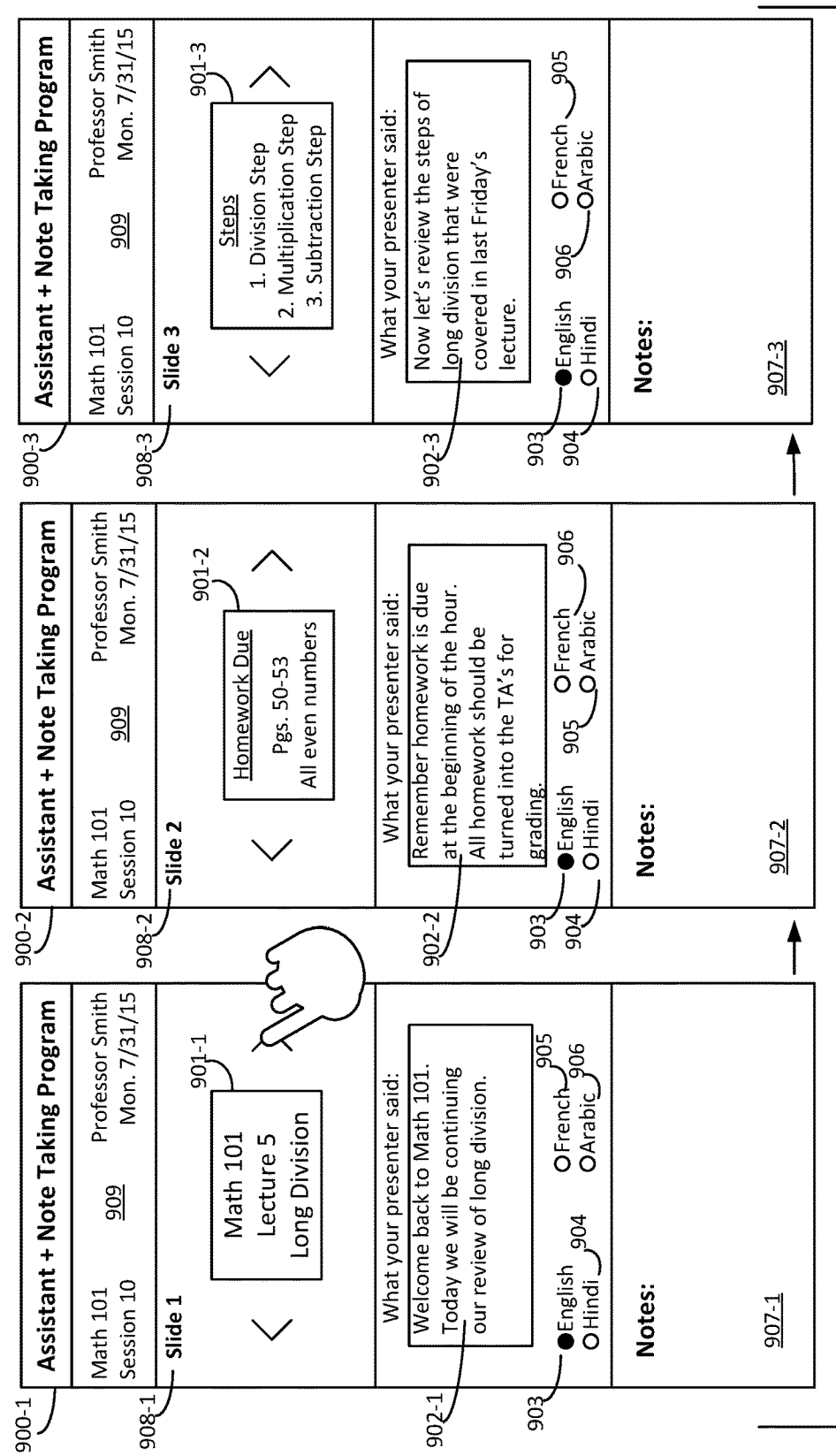
FIG. 9 illustrates another example scenario for contextual note taking.

In some cases, were the images are prepopulated in a form available for a note taking application, the text is displayed in an appropriate region of the form (see e.g., FIGS. 8B and 9). For example, the note taking assistant can be integrated with or communicate with a note taking application to populate a note with the presenter's verbal content. In one case, as mentioned above, a special form can be inserted into the note and populated with the identifiable context images. The note taking assistant can then provide the received text units for association with the appropriate context image. In this manner, a user of the note taking application can annotate and take additional notes while having the presenter's verbal content automatically populate the form.

Referring to FIG. 7B, additional functionality can be included in the note taking assistant. In particular, the end user may choose to change the current language (that the presenter is speaking in) to a different language. The note taking assistant may receive a request for translation from end user's device (708) and an indication of the target language. The target language is the language the current language will be translated into.

The note taking assistant can then initiate two-way communication with a translation service via a translation API (709) and a request to the translation service may be sent (710). The request can include the target language and the most recent unit of text associated with the current presenter context image. The translation may be done using a service or may be completed directly by the note taking assistant (if the translation service is available from a local application).

The note taking assistant receives the translated unit of text associated with the current presenter context image (711) and may then display the translated unit of text associated with the current presenter context image (712).

Further, the note taking assistant may store the translated unit of text associated with the current presenter context image (713).

FIGS. 8A, 8B, and 9 illustrate example scenarios for contextual note taking.

Referring to FIG. 8A, the note taking assistant 801 (Assistant Program) and note taking program 802 are two separate programs. In the view of FIG. 8A, the two programs' graphical interfaces are shown appearing next to each other on one screen. However, the windows may be arranged in any suitable manner. The note taking assistant 801 can include a context image display with navigation 810. STT content corresponding to audio comments from a presenter that is received by the note taking assistant can be displayed associated with the appropriate context image in a text region 803. A context image of a slide 817, with the corresponding text 818 is shown. There are also be options to translate to other languages 804, 805, 806, 807. The user can navigate to different slides using the context image display with navigation 810 and the note taking assistant will still associate the STT content with the correct context slide (as the inserted text to region 803 is based on the navigation information received by the note taking assistant from a navigation message or the STT message and not any navigation information from the user's interaction with the context image display with navigation 810). Indeed, regardless of what slide or page in the presentation the attendee is currently viewing, the note taking assistant will display and store the presenter's converted audio content associated with the correct slide or page of the presentation. Thus, an inattentive attendee or one that is making notes on a different part of the presentation can avoid missing any of the presenter's verbal content and have that verbal content properly associated with the correct visual content.

While the note taking assistant is operating, the user can simultaneously take notes in the note taking program 802. In the example shown in FIG. 8A, a form 808 may be available that can be populated with the slides of the presentation. The user can take their own notes for the slides. In the example form shown in FIG. 8A, thumbnails 812 of the slides, including slide 817 are included in the form with a region for user-entered notes 814. The end user may be able to scroll down the note take program to see the complete list of slides and their notes.

FIG. 8B illustrates an integrated note taking program and note taking assistant. In this example, the form 820 that is populated with the slides of the presentation (the specific presentation session content with identifiable context images) includes, in addition to the thumbnails 812 and region for user-entered notes 814, a region for the STT content 821, which takes the place of region 803 of FIG. 3A. In addition, information about the specific presentation session 822, such as class/session name, date, and URL of the presentation content, can be inserted into the note.

FIG. 9 shows another example of an integrated note taking assistant and note taking program (Assistant+Note Taking Program) 900. Each view of the Assistant+Note Taking Program 900-1, 900-2, 900-3 is the view the end user would see for each slide 901-1, 901-2, 901-3. As the end user chooses which slide 901-1, 901-2, 901-3 to view, the program 900 may display the content and corresponding STT data that was received for that slide and can insert their own notes associated with the displayed slide in region 907-1, 907-2, and 907-3. The regions 907-1, 907-2, and 907-3 allow the end user to take notes for corresponding slide 901-1, 901-2, 901-3, while still receiving all of the audio content from the presenter. The end user may press the arrow located next to the slide 901-1, 901-2, 901-3 to display the view for the next slide or the previous slide. For example, if the end user would like to view slide 1 901-1, the program can display slide 1 901-1 along with any corresponding content. Then, when the end user is ready, they may press the right arrow and slide 2 901-2, along with any corresponding content, will be displayed.

Regardless of what slide or page in the presentation the attendee is currently viewing, the note taking assistant will display and store the presenter's converted audio content associated with the correct slide or page of the presentation. Thus, an inattentive attendee or one that is making notes on a different part of the presentation can avoid missing any of the presenter's verbal content and have that verbal content properly associated with the correct visual content.

The Assistant+Note Taking Program 900 may also include the option to translate the corresponding STT content 902-1 by selecting one of languages 903, 904, 905, 906, below the STT content 902-1 display. Further, the Assistant+Note Taking Program 900 may also contain a region to display information about the presentation 909. The information may include, but is not limited to, the presenter name, date of presentation, name of presentation, etc. In one embodiment, the content in the information region 909 stays the same throughout each view of the Assistant+Note Taking Program 900-1, 900-2, 900-3. The end user may press the arrow next to the slide.

Example specific use cases for a note taking assistant in a classroom environment are provided below.

Note taking experience in classroom is challenging and time consuming. It becomes very difficult to capture all what gets discussed in class. As a student takes their own notes, it is possible to miss the context from the slides themselves. This issue can be solved by using a system that prepopulates sections in Note Taking Applications so that user can easily capture notes corresponding to each slide. The solution will also help in capturing the verbal discussion per slide as Text. Another advancement will help in real time translation for verbal discussion.

For example, a Teacher uses a PowerPoint® Deck to teach his/her class. As the students each launch the note taking assistant in the form of a Classroom Assistant, the Classroom Assistant automatically detects what class they are in and what PowerPoint file the teacher is using. The Classroom Assistant populates a Onenote® page (or other note taking application page) with existing slides and placeholder for the student to take Notes corresponding to each slide. As the teacher talks about each slide, Text to speech conversion happens in the presentation application, enabled by the plug-in of the Presentation Capture Application, and is sent to the students.

As another example, a Teacher uses a PowerPoint Deck to teach his/her class. As the students launch a note taking application with integrated note taking assistant, the note taking application automatically detects what class they are in and what PowerPoint file the teacher is using. The note taking application populates a page with existing slides and placeholder for the student to take Notes corresponding to each slide. As the teacher talks about each slide, Text to speech conversion happens in the presentation application and gets added in the Student's note. Students have the option to choose their language and it provides real time translation for the verbal discussions It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method facilitating contextual note taking, the method comprising:
receiving, at an end user device, an indication of a specific presentation session;
receiving, at the end user device, specific presentation session content, the specific presentation session content comprising identifiable context images;
receiving, from a presenter device, a navigation message via a communication interface of the end user device, wherein the navigation message comprises a location identifier, the location identifier being used to identify a current presenter context image;
responsive to receiving the navigation message, changing, at the end user device, a current assistant context image to the current presenter context image, the current assistant context image corresponding to a context image to which any units of text being received are assigned and the current presenter context image corresponding to a context image a presenter is currently on;
receiving, at the end user device, a speech-to-text message comprising a unit of text associated with the current presenter context image from the presenter device;
displaying, at the end user device, the unit of text associated with the current presenter context image; and
storing the unit of text associated with the current presenter context image regardless of a context image that an end user is currently viewing at the end user device.

2. The method of claim 1, further comprising:
receiving an indication of a target language;
as the unit of text associated with the current presenter context image is received, sending a request to a translation service, the request including the target language and the unit of text associated with the current presenter context image;
receiving a translated unit of text associated with the current presenter context image;
displaying the translated unit of text associated with the current presenter context image; and
storing the translated unit of text associated with the current presenter context image.

3. The method of claim 1, further comprising:
populating a note taking form with the specific presentation session content, including a plurality of the identifiable context images.

4. The method of claim 3, further comprising:
identifying the current presenter context image in the note taking form, wherein the unit of text is inserted and displayed in the note taking form associated with the current presenter context image.

5. The method of claim 4, further comprising:
receiving and displaying user input to the note taking form in a region associated with a different context image than that having the unit of text being inserted and displayed.

6. The method of claim 3, wherein populating the note taking form with the specific presentation session content comprises:
communicating with a note taking application to input and store the specific presentation session content.

7. The method of claim 1, wherein the receiving specific presentation session content comprises:
receiving a unified resource locator (URL) message; and
obtaining the specific presentation specific content at a URL location, identified by the URL message.

8. A system comprising:
a processing system,
a display,
a communication interface,
one or more computer readable storage media, and
a contextual note taking program stored on the one or more computer readable storage media that, when executed by the processing system, directs the processing system to:
in response to receiving, from a presenter device, a navigation message via the communication interface, change a current assistant context image of a specific presentation session content to a current presenter context image of the specific presentation session content, the current assistant context image corresponding to a context image to which any units of text being received are assigned and the current presenter context image corresponding to a context image a presenter is currently on, and wherein the navigation message comprises a location identifier, the location identifier being used to identify the current presenter context image;
in response to receiving, from the presenter device, a speech-to-text message comprising a unit of text, at least display the unit of text associated with the current presenter context image and store the unit of text associated with the current presenter context image regardless of a context image that an end user is currently viewing in the display of the system.

9. The system of claim 8, further comprising:
a note stored on the one or more computer readable storage media,
wherein the contextual note taking program further directs the processing system to:
populate a note taking form in the note with the specific presentation session content, including a plurality of the identifiable context images.

10. The system of claim 9, wherein the contextual note taking program further directs the processing system to:
identify the current presenter context image in the note taking form and insert the unit of text in the note taking form associated with the current presenter context image.

11. The system of claim 10, wherein the contextual note taking program further directs the processing system to:
in response to receiving user input to the note taking form in a region associated with a different context image than that having the unit of text being inserted, display the user input.

12. The system of claim 8, wherein the contextual note taking program further directs the processing system to:
communicate with a note taking application to input and store the specific presentation session content.

13. The system of claim 12, wherein the contextual note taking program further directs the processing system to:

communicate with the note taking application to input the unit of text associated with the current presenter context image.

14. The system of claim 8, wherein the contextual note taking program further directs the processing system to:
in response to receiving a unified resource locator (URL) message for an indicated specific presentation session, obtain the specific presentation specific content at a URL location, identified by the URL message.

15. The system of claim 8, wherein the contextual note taking program further directs the processing system to:
provide translation options for target languages;
receive an indication of a target language;
as the unit of text associated with the current presenter context image is received, send a request to a translation service, the request including the target language and the unit of text associated with the current presenter context image;
receive a translated unit of text associated with the current presenter context image;
display the translated unit of text associated with the current presenter context image; and
store the translated unit of text associated with the current presenter context image.

16. One or more computer readable storage devices having a contextual note taking program stored thereon that when executed by a processing system, directs the processing system to:
in response to receiving, from a presenter device, a navigation message via a communication interface, change a current assistant context image of a specific presentation session content to a current presenter context image of the specific presentation session content at an end user device, the current assistant context image corresponding to a context image to which any units of text being received are assigned and the current presenter context image corresponding to a context image a presenter is currently on, and wherein the navigation message comprises a location identifier, the location identifier being used to identify the current presenter context image;
in response to receiving, from the presenter device, a speech-to-text message comprising a unit of text, at least display the unit of text associated with the current presenter context image at the end user device and store the unit of text associated with the current presenter context image regardless of a context image that an end user is currently viewing at the end user device.

17. The media of claim 16, wherein the contextual note taking program further directs the processing system to populate a note taking form in a note with the specific presentation session content, including a plurality of the identifiable context images.

18. The media of claim 17, wherein the contextual note taking program further directs the processing system to:
identify the current presenter context image in the note taking form and insert the unit of text in the note taking form associated with the current presenter context image.

19. The media of claim 18, wherein the contextual note taking program further directs the processing system to:
in response to receiving user input to the note taking form in a region associated with a different context image than that having the unit of text being inserted, display the user input.

20. The media of claim 16, wherein the contextual note taking program further directs the processing system to:
communicate with a note taking application to input and store the specific presentation session content.

* * * * *